May 6, 1958 E. M. RUNQUIST ET AL 2,833,142
ULTRASONIC, HIGH PRESSURE INTERFEROMETER
Filed Feb. 15, 1955 2 Sheets-Sheet 1

INVENTOR.
ERNEST M. RUNQUIST
BY GRAHAM W. MARKS

ATTORNEYS

May 6, 1958 E. M. RUNQUIST ET AL 2,833,142
ULTRASONIC, HIGH PRESSURE INTERFEROMETER
Filed Feb. 15, 1955 2 Sheets-Sheet 2
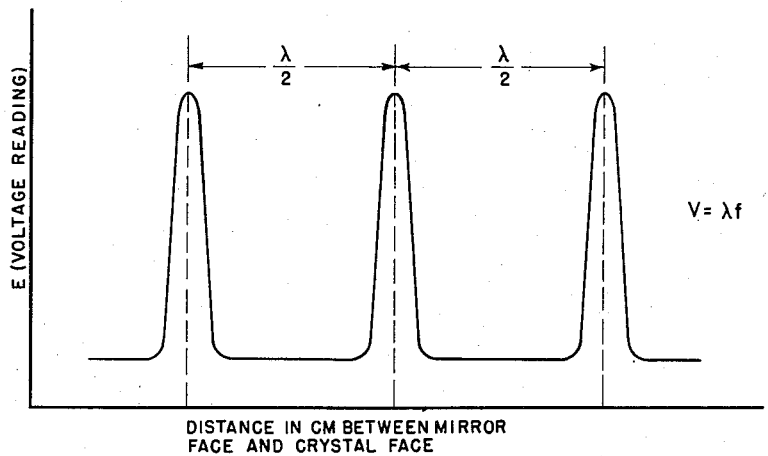
Fig. 3
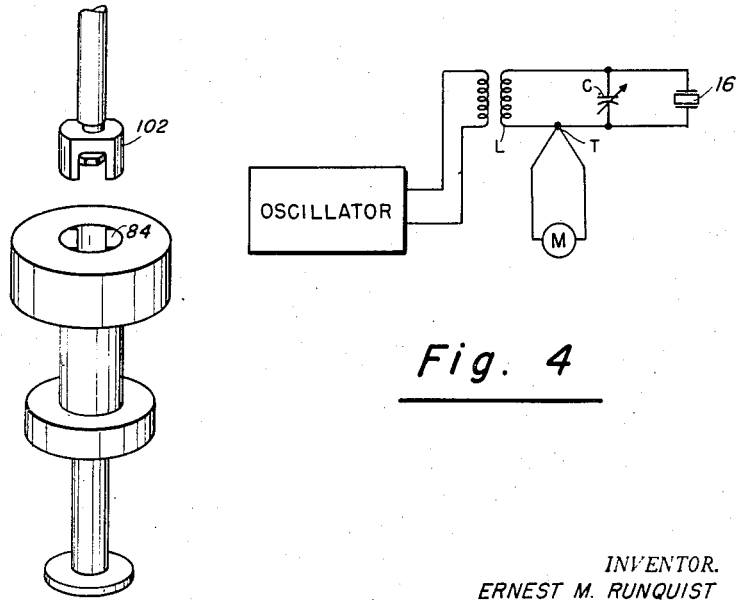
Fig. 2
Fig. 4
INVENTOR.
ERNEST M. RUNQUIST
BY GRAHM W. MARKS
ATTORNEYS

United States Patent Office

2,833,142
Patented May 6, 1958

2,833,142

ULTRASONIC, HIGH PRESSURE INTERFEROMETER

Ernest M. Runquist and Graham W. Marks,
San Diego, Calif.

Application February 15, 1955, Serial No. 488,442

8 Claims. (Cl. 73—53)

(Granted under Title 35, U. S. Code (1952), sec. 266)

The invention described herein may be manufactured and used by or for the Government of the United States of America for governmental purposes without the payment of any royalties thereon or therefor.

The present invention relates to an ultrasonic, high pressure interferometer, and, more particularly, to a variable path interferometer for effecting precision measurements of pressure, temperature, composition or velocity.

Variable path interferometers heretofore known require a high pressure packing about an axially movable and rotatable adjusting shaft constituting a source of leakage of the desired high pressures which must remain invariable during certain measurements. Too, the wave reflector of such devices must rotate with the adjusting shaft thereby introducing possible changes in the parallelism between the plane of the reflecting surface and the plane of the piezoelectric crystal, this parallelism being a basic requisite of proper operation of the interferometer. Prior devices make no provision for adjustment to obtain and maintain this parallelism.

The ultrasonic interferometer of the present invention comprises a fluid-tight housing having therein a chamber for holding fluid under extremely high pressure, means for applying pressure to the fluid in said chamber, a piezoelectric crystal mounted in said chamber, a reflector in said chamber carried by a non-rotatable axially shiftable shaft which is mounted entirely within the housing, said reflector being adjacent to and spaced from a face of the crystal, means for sustaining oscillations through the crystal, means for adjusting said crystal for parallelism with the reflector and a magnetic coupling means between said shaft and the outside of the housing for varying the spacing between the crystal and reflector without affecting the fluid seal of the housing.

An object of this invention is to provide an instrument for measuring wave velocity in fluids at various temperatures and pressures.

A further object of this invention is the provision of an instrument from which pressure coefficients and temperature coefficients of wave velocities may be directly determined and from which various thermodynamic coefficients also may be determined.

A still further object of this invention is the provision of an interferometer, which is particularly suited for obtaining measurements in fluids under high pressures and which is effectively sealed against pressure loss.

Another object of this invention is the provision of a variable path interferometer including a means for adjusting the reflector position which does not decrease the effectiveness of the pressure seal.

Still another object of this invention is the provision of a means for adjusting the crystal of an interferometer to obtain parallelism between the crystal and the reflector.

Still another object of this invention is the provision of a pressure-sealed electrical conduit connecting a sealed universally adjustable crystal of an interferometer to an external oscillating source.

Other objects and many of the attendant advantages of this invention will be readily appreciated as the same becomes better understood by reference to the following detailed description when considered in connection with the accompanying drawings wherein:

Fig. 2 is a perspective of a portion of the interferometer showing the relation of the magnetic coupling elements;

Fig. 3 is typical curve constructed from measurements obtained by using the interferometer of this invention; and Fig. 4 is a schematic illustration of one form of the crystal circuitry.

Figure 1:
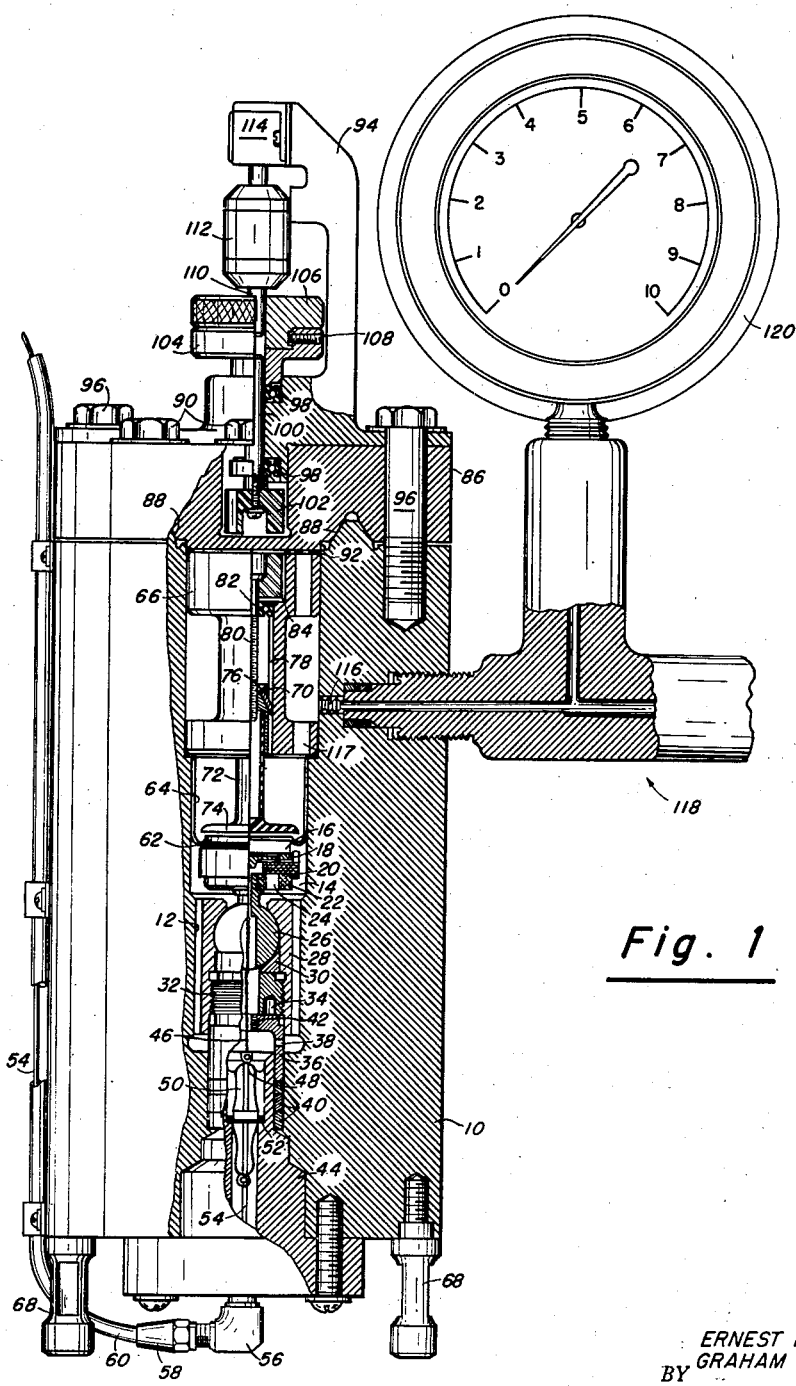
Fig. 1 is a side elevation of the interferometer of the present invention with parts broken away.

Fundamentally, the interferometer is an instrument which, as pressure, temperature, composition or frequency is varied, produces a current having sharply defined peak values which peaks occur when the distance between the parallel faces of a source of vibration and a mirror or reflector is equal to an integral multiple of one half wave length of the standing wave set up in the medium between said faces. A fluid filled chamber contains a planar source for generating an ultrasonic wave which is propagated through the fluid to a planar reflector parallel to the source and is reflected back to the source. The generating source is a piezoelectric crystal in an oscillating circuit of known frequency and the reflected wave is received by the same crystal and thereby modifies in accordance with the phase and amplitude of the reflected waves, the current in the oscillating circuit which is detected by suitable instruments. Since velocity of a wave in a particular fluid at a given temperature and pressure is the product of the wavelength and frequency, any one of the variables, composition, velocity, temperature and pressure may be simply calculated if the others are known.

Referring now to Fig. 1, a housing 10 of stainless steel or similar high strength corrosion resistant material, is formed with a bore 12 having a fluid chamber 14 in which is positioned a plane parallel piezoelectric crystal 16 carried by a crystal mounting cup 18 which rests on the radially grooved surface of an insulator 20 of suitable nonconducting material. The insulator 20 is carried by a nut 22 having tool receiving sockets 24 (only one of which is shown) therein and threaded on a shouldered stud projecting from ball 26 which is universally mounted in a two-piece race 28, 30 and clamped therein by nut 32 which has tool receiving sockets 34 (only one of which is shown) and is threaded into race element 28 and abuts race element 30. Sealing sleeve 36, formed to maintain a close engagement with the housing bore, has fluid passages 38 (only one of which is shown) and is in abutment at one end thereof with nut 34 while the other end thereof provides a seat for packing rings 40. The inner end of sleeve 36 is internally threaded as at 42 to receive a threaded rod which is used to facilitate disassembly. Internally, sleeve 36 and packing rings 40 receive a plug 44 pressed into and bolted to housing 10 to compress rings 40. Plug 44 may be threaded instead of pressed into the housing but it has been found that such threads will lock or freeze after being subjected to high pressures and the threaded plug is actually more difficult to remove than that shown. Elements 20, 22, 26, 30, 32, 36, and 44 are each apertured to provide a conduit for suitable electrical conductors which connect the crystal with an external source of electrical oscillations. These conductors include glass beaded element 46 connected at one end to crystal mounting cup 18 and at its other end to conductor 48 embedded in glass insulator 50, the latter being permanently pressure sealed within plug 44 by a metal ring 52 of solder or the like which seats on a shoulder of the plug. Conductor 54 completes this electric connection and is located within threaded fittings 56, 58, and conduit 60. The other side of crystal 16 is electrically connected to the housing 10 by a thin gold plated cover 62 which receives the upper portion of the crystal and a ground strip 64 which is clamped, as shown, between abutting shoulders on the housing and the screw and nut mounting 66. The housing is provided with ground connections 68 which also provide supports therefor.

The mounting 66 has an internal bore which snugly receives a nut 70 which is fixed to integral hollow shaft portion 72 of the reflector or mirror 74. A key 76 riding in keyway 78 of mounting 66 is fixed to nut 70 and prevents rotation of the nut, shaft and mirror while permitting axial movement thereof. This axial movement is effected by rotation of screw 80 which is threaded into the nut, is journalled in bearings 82 and has one end fixed to a driven permanent magnet 84. The sealing of the upper end of the housing is effected by a high strength cap 86 of non-magnetic material such as beryllium copper having sealing surfaces 88 which are accurately ground to precisely mate with corresponding surfaces of the housing. Bolts 90 secure the cap to the housing and gasket 92 maintains the position of mounting 66.

A support 94, secured to cap 86 and housing 10 by bolts 96, rotatably carries in bearings 98 a rod 100 which has its opposite ends respectively fixed to a driving permanent magnet 102 and a first zero-set nut 104. A second zero-set nut 106 having a depending hub which is journalled in a recess of nut 104 and selectively secured to the latter by set screw 108, fixedly carries a shaft 110 of one end of a gear reduction unit 112 which has its other end coupled to a revolution counter 114 for indirectly reading the linear distance between the crystal and reflector.

The means for supplying pressure to chamber 14 comprises a sylphon or spring bellows 116 which contains a portion of the fluid filling bore 12 through passage 117 and is actuated, together with pressure gage 120, by fluid under pressure supplied through fittings 118 by suitable means such as a high pressure pump (not shown). Conveniently, a strain gage may be substituted for gage 120.

Fig. 4, which schematically depicts one circuit which may be used with the interferometer of this invention, shows the crystal 16 connected across the variable capacitor C of a tuned circuit which includes inductance L and is loosely coupled to the output coil of a variable frequency oscillator of variable amplitude. The current in the tuned circuit is read from the meter M connected to thermocouple T. Alternatively the output of the tuned circuit may be applied to the control grid of an electron tube which in turn supplies a variable D. C. current to a galvanometer. The latter is a well-known and conventional measuring arrangement, an exemplary form of which is shown and described on page 90 of "Radio Fundamentals," War Department Technical Manual, TM 11-455, published by the War Department in 1944. The crystal, when oscillations are sustained therethrough, emits acoustic waves into the surrounding medium which are reflected back upon the emitting face of the source to cause a characteristic reaction upon the amplitude of vibration of the crystal, in accordance with the phase and amplitude of the waves so received. The position of the reflector relative to the crystal is varied by turning knurled nuts 104, 106 to rotate driving magnet 102 which, being magnetically coupled to magnet 84 through the cap, in turn causes rotation of driven magnet 84 and screw 80 to axially shift nut 70, shaft 72, and reflector 74. Movement of the reflector causes cyclical variations of current or voltage to occur in the electrical measuring circuit associated with the source. When the source and reflector are plane parallel, and of large dimensions relative to the acoustic wavelength in the medium, successive peaks of current or voltage occur at reflector positions which are one-half wavelength apart. The successive current peaks shown in Fig. 3 may increase or decrease in accordance with the specific variable and direction of change of the variable.

For sharp, well-defined peaks, the parallelism of crystal and reflector is essential and, therefore, the crystal of this invention is universally adjustable. Conversely, it is the sharpness of these peaks which is utilized to adjust for the required parallelism. Lack of parallelism yields a rough, poorly defined and jagged peak. Therefore, the ball 26 is adjusted with the interferometer in operation and locked in that position which yields the sharpest peak. In this operation the reflector may be moved back and forth through its one-half wavelength position. To effect the adjustment, plug 44 and sleeve 36 are removed, a common insulated conductor is substituted for elements 48—52, a hollow, elongated tool is inserted into sockets 34 to loosen nut 32 (and race element 30) and a long, slender rod is inserted through the hollow tool and into the bore of the ball 26 which may then be manually moved to the desired position and is then locked by retightening nut 32 while it is held in position by the rod.

The particular rotation-to-axial movement embodied in this invention provides an accuracy not previously obtainable in a variable path interferometer for the reason that the movement of the reflector is solely axial and no rotation thereof occurs to affect the parallelism. Further, the magnetic coupling of the reflector shifting means enables the utilization of a seal of the type shown which has been found to be effective for pressures up to 20,000 pounds per square inch, the limit of the strength of non-magnetic cap 86. For higher pressures, up to 50,000 pounds per square inch, the present invention may be utilized as a fixed path interferometer by substituting for the non-magnetic cap, a cap of stainless steel. In such an arrangement magnet 102 cannot be used because of its proximity to the magnetic cap and the reflector would be pre-set before the cap is secured.

When set screw 108 is loosened, zero-set nut 106 may be turned to set the counter without rotating rod 100 or shifting reflector 74.

Obviously many modifications and variations of the present invention are possible in the light of the above teachings. It is therefore to be understood that within the scope of the appended claims the invention may be practiced otherwise than as specifically described.

What is claimed is:

1. An ultrasonic interferometer comprising a sealed housing having a chamber therein for holding fluid under high pressure, piezoelectric means in said chamber for generating vibrations in the fluid within said chamber, universally adjustable means in said housing for supporting said piezoelectric means, a shaft slidably non-rotatably mounted within said housing for axial movement, a reflector carried by said shaft in said chamber, and rotatable means threadedly engaged with said shaft and secured against axial movement within said housing for axially moving said shaft.

2. An ultrasonic interferometer comprising a sealed housing having a chamber therein for holding fluid under high pressure, means for applying pressure to the fluid in said chamber, piezoelectric means for generating vibrations in the fluid within said chamber, adjustable means in said housing for supporting said piezoelectric means, a shaft non-rotatably mounted within said housing for axial movement, a reflector carried by said shaft in said chamber, and means for axially moving said shaft, said last mentioned means comprising a rotatable actuating rod threaded into said shaft and carried entirely within said housing, magnetic means fixed to said rod, and an external actuating means magnetically coupled to said magnetic means for rotating said rod.

3. An ultrasonic interferometer comprising a sealed housing having a chamber therein for holding fluid under high pressure, means for applying pressure to the fluid in said chamber, piezoelectric means in said chamber for generating vibrations in the fluid within said chamber, adjustable means in said housing for supporting said piezoelectric means, a shaft non-rotatably mounted within said housing for axial movement, a reflector carried by said shaft in said chamber, and means for axially moving said shaft, said last mentioned means comprising a rotatable actuating rod having one end thereof threaded into said shaft and carried entirely within said housing, a first magnet fixed to the other end of said shaft and located entirely within said housing, and a second magnet rotatably supported externally of said housing and magnetically coupled with said first magnet for rotating said actuating rod without affecting the seal of said housing.

4. An ultrasonic interferometer comprising a sealed housing having a chamber therein for holding fluid under high pressure, means for applying pressure to the fluid in said chamber, a shaft non-rotatably mounted within said housing for axial movement, a reflector carried by said shaft in said chamber, and means for axially moving said shaft, said last mentioned means comprising a rotatable actuating rod threaded into said shaft and carried entirely within said housing and an external actuating means magnetically coupled to said rod, piezoelectric means in said chamber for generating vibrations in the fluid within said chamber, external means for sustaining oscillations through said piezoelectric means, and adjustable means in said housing for supporting said piezoelectric means, said adjusting means comprising an apertured, universally mounted ball, said oscillation sustaining means including a conductor extending through said ball aperture and connected to said piezoelectric means.

5. In a pressure sealed ultrasonic interferometer, a housing having a bore therein for holding fluid under pressure and providing a chamber, a reflector, reflector mounting means carried entirely within one end of said bore for supporting said reflector in said chamber, a hollow shaft secured to said reflector and slidably received in said mounting means, means for preventing rotation of said shaft and reflector, a rod journalled in said mounting means and having one end thereof threaded into one end of said shaft, a magnet secured to the other end of said rod, a cap secured to said housing at said bore end for sealing one end of said housing with rod, reflector and mounting means therein, a crystal mounted in said chamber and means for sealing the other end of said housing and bore.

6. In a pressure sealed ultrasonic interferometer, a housing having a bore therein for holding fluid under pressure and providing a chamber, a reflector, reflector mounting means carried entirely within one end of said bore for supporting said reflector in said chamber, a hollow shaft secured to said reflector and slidably received in said mounting means, means for preventing rotation of said shaft and reflector, a rod journalled in said mounting means and having one end thereof threaded into one end of said shaft, a first magnet secured to the other end of said rod, a cap secured to said housing at said bore end sealing one end of said housing with rod, reflector and mounting means therein, a support carried by said cap externally of said housing, a second magnet journalled in said support and magnetically coupled through said cap to said first magnet, means for detecting rotation of said second magnet, a crystal mounted in said chamber, means for adjusting said crystal for parallelism with said reflector, and means for sealing the other end of said housing and bore.

7. In a pressure sealed ultrasonic interferometer, a housing having a bore therein for holding fluid under pressure and providing a chamber, a crystal in said chamber, crystal mounting means carried in one end of said bore for supporting said crystal and sealing said one end, said mounting means including a mounting cup receiving said crystal, a two part ball race, an apertured ball universally mounted in said race and fixed to said cup, an apertured nut threaded into one race part and abutting the other for locking said ball in said race, a first conductor extending through said apertured ball and nut and connected to said cup for coupling said crystal with an external source of electrical oscillation, said mounting means further including a sealing plug detachably secured to and within said one end, packing means between said plug and bore, said plug having an internal shouldered bore receiving a portion of said conductor, means seating on the shoulder of said plug bore for sealing said conductor portion within said shouldered bore, a reflector mounted in said chamber, means for sealing the other end of said bore, and a second conductor coupling said crystal with said external source.

8. In a pressure sealed ultrasonic interferometer, a housing having a bore therein for holding fluid under pressure and providing a chamber, a reflector mounted entirely within one end of said bore and in said chamber for movement axially of said bore, a non-magnetic cap secured to said housing at said bore end for sealing one end of said housing and the reflector therein, driven means disposed within said sealed housing for converting rotary movement to rectilinear movement, said driven means comprising a rotatable magnetic member disposed adjacent said cap and a rectilinearly movable member connected to said reflector and mounted for axial movement within said bore, rotatable means located externally of said housing and magnetically coupled to said rotatable member of said driven means through said cap for actuating said driven means to effect said axial movement of said reflector, a crystal mounted in said chamber, and means for sealing the other end of said housing and bore.

References Cited in the file of this patent

UNITED STATES PATENTS 2,536,025   Blackburn _____ Jan. 2, 1951

OTHER REFERENCES

Article by G. Holton in "Journal of Applied Physics," vol. 22, No. 12, Dec. 1951, pp. 1407–1413.